(12) United States Patent
Pham et al.

(10) Patent No.: US 6,793,700 B2
(45) Date of Patent: Sep. 21, 2004

(54) APPARATUS AND METHOD FOR PRODUCTION OF SYNTHESIS GAS USING RADIANT AND CONVECTIVE REFORMING

(75) Inventors: Hoanh Nang Pham, Allentown, PA (US); Shoou-I Wang, Allentown, PA (US); David Hon Sing Ying, Allentown, PA (US); Kevin Boyle Fogash, Wescosville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 432 days.

(21) Appl. No.: 10/046,585

(22) Filed: Jan. 14, 2002

(65) Prior Publication Data

US 2003/0131533 A1 Jul. 17, 2003

(51) Int. Cl.[7] ................................................ C01B 3/24
(52) U.S. Cl. .................. 48/198.7; 48/127.9; 48/197 R; 48/197 FM; 48/62 R; 48/89; 48/119; 422/196; 422/197; 422/198; 422/204; 252/373
(58) Field of Search ............................ 48/61, 62 R, 75, 48/63, 64, 89, 102 R, 105, 107, 102 A, 93, 95, 119, 120, 127.9, 197 R, 198.1, 198.6, 198.7, 211, 212, 213, 214 R, 215, 214 A, 197 FM; 422/188–191, 193, 196–198, 200–202, 204, 211, 236; 252/373

(56) References Cited

U.S. PATENT DOCUMENTS 3,607,125 A * 9/1971 Kydd .......................... 422/197
3,909,299 A * 9/1975 Corrigan ..................... 422/190
4,830,834 A   5/1989 Stahl et al. .................. 422/190
4,959,079 A   9/1990 Grotz et al. ................ 48/198.7
5,199,961 A   4/1993 Ohsaki et al. ................. 48/94
5,935,531 A   8/1999 Giacobbe .................... 422/197

FOREIGN PATENT DOCUMENTS

EP   0911076   4/1999
EP   1193219   4/2002   ............ C01B/3/38
WO   0112310   2/2001

OTHER PUBLICATIONS

Pending Patent Applications (Air Products and Chemicals, Inc.; USA) "Apparatus and Method for Hydrocarbon Reforming Process".

* cited by examiner

Primary Examiner—Samuel M. Heinrich
(74) Attorney, Agent, or Firm—Keith D. Gourley

(57) ABSTRACT

An apparatus for a hydrocarbon reforming process includes a combustion chamber, a convection chamber in fluid communication with the combustion chamber, at least one burner disposed in the combustion chamber, a reaction chamber, a means for flowing a first mixed-feed through a first part of the reaction chamber, and a means for flowing a second mixed-feed through an annular portion of a second part of the reaction chamber, the second part being a tube-in-tube in fluid communication with the first part. The burner(s) generates a flow of a flue gas having a sensible heat from the combustion chamber to the convection chamber. The flow of the flue gas in the convection chamber is counter-currently with the flow of the second mixed-feed.

20 Claims, 3 Drawing Sheets

APPARATUS AND METHOD FOR PRODUCTION OF SYNTHESIS GAS USING RADIANT AND CONVECTIVE REFORMING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to processes for the production of a gas containing hydrogen and carbon oxides (such as methanol synthesis gas) by steam reforming a hydrocarbon feedstock, and in particular to an apparatus and method for hydrocarbon reforming processes which utilize high grade sensible heat of flue gas and product synthesis gas to generate additional product gas and minimize steam export.

The steam reforming process is a well known chemical process for hydrocarbon reforming. A hydrocarbon and steam mixture (a "mixed-feed") reacts in the presence of a catalyst to form hydrogen, carbon monoxide and carbon dioxide. Since the reforming reaction is strongly endothermic, heat must be supplied to the reactant mixture, such as by heating the tubes in a furnace or reformer. The amount of reforming achieved depends on the temperature of the gas leaving the catalyst; exit temperatures in the range 700–900° C. Are typical for conventional hydrocarbon reforming.

Conventional catalyst steam reformer processes combustor fuel to provide the energy required for the reforming reaction. In a reformer of such a conventional process, fuel typically is fired co-current to incoming cold feed gas to maximize heat flux through the tube wall(s) by radiant heat transfer directly from the flame. Downstream from the burner end, both the product gas and the flue gas exit at relatively high temperatures. The energy content of these gases usually is recovered by preheating reformer feed gas or by generating steam. As a result, the process generates excess steam that must be exported to improve the overall efficiency of the steam reforming process and to make the process economically feasible in view of the fact that significant equipment has been added to generate that excess steam.

Each of the processes disclosed in U.S. Pat. No. 5,199,961 (Osaka, et al.) and U.S. Pat. No. 4,830,834 (Stall, et al) and in European Pat. No. SP 0 911 076 A1 (Stall) utilize a portion of the available sensible energy within the reformer vessel, thereby allowing the product gas and the flue gas to exit at lower temperatures than the corresponding exit temperatures for conventional steam reforming. These reforming processes receive heat from the combustible fuel by using a combination of: (1) an equalizing wall (made of tiles, refractory, or metals) to receive radiant heat directly from the flame from which heat is transferred to the reformer tube(s) by radiant heat; and (2) an arrangement of a counter-current flow of the hot flue gas with the incoming feed which transfers sensible energy to the incoming feed by convection through the tube wall. These techniques allow the temperature of the reformer tube skin to be controlled within the design limit; otherwise, the temperature will be excessive due to the high intensive radiant heat of the flame. However, these processes suffer a heat flux limitation by avoiding the direct radiant heat from the flame to the tube as commonly used in conventional reformers.

The reformer disclosed in WO 01/12310 (Loiacono) recovers the sensible heat of product gas by the use of a tube within a tube (tube-in-tube) arrangement having catalyst in the annuli of the tube-in-tube. The cold feed in the annuli flows counter current with the combustion or the flue gas from the outside and absorbs the combustion heat by both radiant and convection heat transfers through the outside tube wall. The reformed gas flow is reversed at the end of the catalyst bed and enters the inner most passage of the tube. The reformed gas then gives up heat to the counter current flow of the incoming cold feed. The convection heat transfer process from the hot product gas to the reforming reactions, however, is not effective because there is no temperature driving force at the inversion point. As a result, more heat transfer area is required to utilize the product gas sensible heat. This arrangement uses a different inner tube configuration to provide additional surface required. However, it fails to recover high temperature sensible heat from the flue gas and suffers the same heat flux limitation as the prior art reformers discussed above.

U.S. Pat. No. 4,959,079 (Grotz, et al.) utilizes counter-current flow and a studded tube to recover the sensible heat of the flue gas for reforming but fails to recover the high temperature sensible heat of the process gas. Side-fired burners are used to maximize the heat flux to the tube. However, the side-fired burner arrangement limits the furnace to one tube row, and many burners are required. Heat lost through the furnace wall is significant as capacity increases.

A pending patent application (Air Products and Chemicals, Inc.'s Docket No. 06052 USA) teaches the use of partition walls within the radiant chamber, which resolved the excess steam generating problem. However, it requires a high temperature gas transfer line from the radiant tubes to the convection tubes, and a complex tube arrangement that is difficult to scale up or down in terms of capacity.

It is desired to have an apparatus and a method for hydrocarbon reforming processes which overcome the difficulties, problems, limitations, disadvantages and deficiencies of the prior art to provide better and more advantageous results.

It is further desired to have an apparatus and a method for a hydrocarbon reforming process which utilize high grade sensible heat of flue gas and product synthesis gas to generate additional product gas and minimize steam export.

It is still further desired to have a more efficient and economic process and apparatus for hydrocarbon reforming.

BRIEF SUMMARY OF THE INVENTION

The invention is an apparatus for a hydrocarbon reforming process and a method for producing a product from a steam reforming process.

The first embodiment of the apparatus includes: a combustion chamber, a convection chamber in fluid communication with the combustion chamber, at least one burner disposed in the combustion chamber, and a reaction chamber. The combustion chamber has a first end and a second end opposite the first end. The convection chamber has a first end and a second opposite the first end, the first end of the convection chamber being adjacent the second end of the combustion chamber. The at least one burner is disposed in the combustion chamber and is adapted to combustor a fuel, thereby generating a flow of a flue gas from the combustion chamber to the convection chamber, the flue gas having a sensible heat. The reaction chamber has a first part and a second part in fluid communication with the first part. A substantial portion of the first part is disposed in the combustion chamber and a substantial portion of the second part is disposed in the convection chamber. The second part is a tube-in-tube having an annular portion between an inner tubular portion and an outer tubular portion surrounding the inner tubular portion. The apparatus also includes a means for flowing a first mixed-feed through the first part of the reaction chamber, and a means for flowing a second mixed-feed through the annular portion of the second part of the reaction chamber counter-currently with the flow of the flue gas in the convection chamber.

There are several variations of the first embodiment of the apparatus. In one variation, the substantial portion of the first part of the reaction chamber is substantially vertical in the combustion chamber, and the substantial portion of the second part of the reaction chamber is substantially vertical in the convection chamber. In a second variation, the first mixed-feed flows co-currently with the flow of the flue gas in the combustion chamber. There are several variants of the second variation. In one variant, a gas having another sensible heat is injected adjacent the second end of the combustion chamber, the gas initially flowing in the combustion chamber counter-currently with the first mixed-feed. In another variant, the apparatus includes at least another burner. The another burner is located adjacent the second end of the combustion chamber, and is adapted to combustor a portion of the fuel or another fuel, thereby generating a flow of another flue gas having another sensible heat, the another flue gas initially flowing in the combustion chamber counter-currently with the first mixed-feed. In yet another variant, the apparatus includes at least another burner disposed in the combustion chamber. The another burner is adapted to combustor a portion of the fuel or another fuel, thereby generating a flow of another flue gas having another sensible heat, the another flue gas initially flowing in the combustion chamber in an initial direction other than co-currently or counter-currently with the first mixed-feed.

A second embodiment of the apparatus is similar to the first embodiment but includes a mixing means in the reaction chamber adapted for mixing the first mixed-feed and the second mixed-feed.

A third embodiment of the apparatus is similar to the first embodiment but includes a means for removing a product stream from the inner tubular portion of the tube-in-tube, the product stream flowing through the inner tubular portion counter-currently with the second mixed-feed.

A fourth embodiment of the apparatus includes: a combustion chamber, a convection chamber is fluid communication with the combustion chamber, at least two reaction chambers spaced apart in substantially parallel relationship, and a plurality of burners disposed in the combustion chamber. The combustion chamber has a first end and a second end opposite the first end. The convection chamber has a first end and a second end opposite the first end, the first end of the convection chamber being adjacent the second end of the combustion chamber. Each reaction chamber has a first part and a second part in fluid communication with the first part. A substantial portion of the first part is disposed in the combustion chamber and a substantial portion of the second part is disposed in the convection chamber. The second part is a tube-in-tube having an annular portion between an inner tubular portion and an outer tubular portion surrounding the inner tubular portion. Each burner is adapted to combustor a fuel, thereby generating a flow of a flue gas from the combustion chamber to the convection chamber, the flue gas having a sensible heat. At least one burner is positioned between the two reaction chambers, a first reaction chamber is positioned between the first burner and a second burner, and a second reaction chamber is positioned between the first burner and a third burner. The apparatus also has a means for flowing a first mixed-feed through the first part of each reaction chamber co-currently with the flow of the flue gas in the combustion chamber, and a means for flowing a second mixed-feed through the annular portion of the second part of each reaction chamber counter-currently with the flow of the flue gas in the convection chamber. In addition, the apparatus has a mixing means in each reaction chamber adapted for mixing the first mixed-feed and the second mixed-feed, and a means for removing a product stream from the inner portion of the tube-in-tube, the product stream flowing through the inner tubular portion counter-currently with the second mixed-feed.

A fifth embodiment of the apparatus includes: a combustion chamber, a convection chamber in fluid communication with the combustion chamber, at least one reaction chamber, and a plurality of burners disposed in the combustion chamber. The combustion chamber has a first end and a second end opposite the first end. The convection chamber has a first end and a second end opposite the first end, the first end of the convection chamber being adjacent the second end of the combustion chamber. The reaction chamber has a first part and a second part in fluid communication with the first part. A substantial portion of the first part is disposed in the combustion chamber and a substantial portion of the second part is disposed in the convection chamber. The second part is a tube-in-tube having an annular portion between the inner tubular portion and an outer tubular portion surrounding the inner tubular portion. Each burner is adapted to combustor a fuel, thereby generating a flow of a flue gas from the combustion chamber to the convection chamber, the flue gas having a sensible heat. The reaction chamber is positioned between a first burner and a second burner. The apparatus also includes a means for flowing a first mixed-feed through the first part of the reaction chamber co-currently with the flow of the flue gas in the combustion chamber, and a means for flowing a second mixed-feed through the annular portion of the second part of the reaction chamber counter-currently with the flow of the flue gas in the convection chamber. In addition, the apparatus includes a mixing means in the reaction chamber adapted for mixing the first mixed-feed and the second mixed-feed, and a means for removing a product from the portion of the tube-in-tube, the product stream flowing through the inner tubular portion counter-currently with the second mixed-feed.

A first embodiment of the method for producing a product from a steam reforming process includes multiple steps. The first step is to provide a combustion chamber having a first end and a second end opposite the first end. The second step is to provide a convection chamber in fluid communication with the combustion chamber, the convection chamber having a first end and a second end opposite the first end, the first end of the convection chamber being adjacent the second end of the combustion chamber. The third step is to provide a reaction chamber having a first part and a second part in fluid communication with the first part, a substantial portion of the first part being disposed in the combustion chamber and a substantial portion of the second part being disposed in the convection chamber, wherein the second part is a tube-in-tube having an annular portion between the inner tubular portion and an outer tubular portion surrounding an inner tubular portion. The fourth step is to combustor a fuel in the combustion chamber, thereby generating a combustion heat and a flow of a flue gas from the combustion chamber to the convection chamber, the flue gas having a sensible heat. The fifth step is to feed a first mixed-feed to the first part of the reaction chamber, wherein at least a portion of the first mixed-feed absorbs at least a portion of the combustion heat. The sixth step is to feed a second mixed-feed to the annular portion of the second part of the reaction chamber, wherein the second mixed-feed flows counter-currently with the flow of the flue gas in the convection chamber, whereby at least a portion of the second mixed-feed absorbs at least a portion of the sensible heat.

There are several variations of the first embodiment of the method. In one variation, the substantial portion of the first part of the reaction chamber is substantially vertical in the combustion chamber and the substantial portion of the second part of the reaction chamber is substantially vertical in the convection chamber. In a second variation, the second mixed-feed flows co-currently with the flow of the flue gas in the combustion chamber. There are several variants of the second variation. One variant includes an additional step of injecting a gas having another sensible heat near the second end of the combustion chamber, the gas initially flowing in the combustion chamber counter-currently with the first mixed-feed. Another variant includes an additional step of combusting a portion of the fuel or another fuel near the second end of the combustion chamber, thereby generating another combustion heat and a flow of another flue gas having another sensible heat, wherein another flue gas initially flows in the combustion chamber counter-currently with the first mixed-feed. Yet another variant includes an additional step of combusting a portion of the fuel or another fuel in the combustion chamber, thereby generating another combustion heat and a flow of another flue gas having another sensible heat, wherein the another flue gas initially flows in the combustion chamber in an initial direction other than co-currently or counter-currently with the first mixed-feed.

A second embodiment of the method is similar to the fist embodiment but includes the further step of mixing the first mixed-feed and the second mixed-feed in the reaction chamber.

A third embodiment of the method is similar to the first embodiment but includes the further step of removing a product stream from the inner tubular portion of the tube-in-tube, the product stream flowing through the inner tubing portion counter-currently with the second mixed-feed.

A fourth embodiment of the method includes a plurality of steps. The first step is to provide a combustion chamber having a first end and a second end opposite the first end. The second step is to provide a convection chamber in fluid communication with the combustion chamber, the convection chamber having a first end and a second end opposite the first end, the first end of the convection chamber being adjacent the second end of the combustion chamber. The third step is to provide at least two reaction chambers spaced apart in substantially parallel relationship, each reaction chamber having a first part and a second part in fluid communication with the first part, a substantial portion of the first part being disposed in the combustion chamber and a substantial portion of the second part being disposed in the convection chamber, wherein the second part is a tube-in-tube having an annular portion between an inner tubular portion and an outer tubular portion surrounding the inner tubular portion. The fourth step is to provide a plurality of burners disposed in the combustion chamber, each burner adapted to combustor the fuel, wherein at least one first burner is positioned between the two reaction chambers, a first reaction chamber is positioned between the first burner and a second burner, and a second reaction chamber is positioned between the first burner and the third burner. The fifth step is to combustor a fuel in the burners, thereby generating a combustion heat and a flow of a flue gas from the combustion chamber to the convection chamber, the flue gas having a sensible heat. The sixth step is to feed a first mixed-feed to the first part of each reaction chamber, wherein the first mixed-feed flows co-currently with the flow of the flue gas in the combustion chamber, and at least a portion of the first mixed-feed absorbs at least a portion of the combustion heat. The seventh step is to feed a second mixed-feed to the annular portion of the second part of each reaction chamber, wherein the second mixed-feed flows counter-currently with the flow of the flue gas in the convection chamber, whereby at least a portion of the second mixed-feed absorbs at least a portion of the sensible heat. The eighth step is to mix the first mixed-feed and the second mixed-feed in each reaction chamber. The ninth step is to remove a product stream from the inner portion of the tube-in-tube, wherein the product stream flows through the inner tubular portion counter-currently with the second mixed-feed.

A fifth embodiment of the method includes multiple steps. The first step is to provide a combustion chamber having a first end and a second end opposite the first end. The second step is to provide a convection chamber in fluid communication with the combustion chamber, the convection chamber having a first end and a second end opposite the first end, the first end of the convection chamber being adjacent the second end of the combustion chamber. The third step is to provide at least one reaction chamber having a first part and a second part in fluid communication with the first part, a substantial portion of the first part being disposed in the combustion chamber and a substantial portion of the second part being disposed in the convection chamber, wherein the second part is a tube-in-tube having an annular portion between an inner tubular portion and an outer tubular portion surrounding the inner tubular portion. The fourth step is to provide a plurality of burners disposed in the combustion chamber, each burner adapted to combustor a fuel, wherein the reaction chamber is positioned between a first burner and a second burner. The fifth step is to combustor a fuel in the burners, thereby generating a combustion heat and a flow of a flue gas from the combustion chamber to the convection chamber, the flue gas having a sensible heat. The sixth step is to feed a first mixed-feed to the first part of the reaction chamber, wherein the first mixed-feed flows co-currently with the flow of the flue gas in the combustion chamber, wherein at least a portion of the first mixed-feed absorbs at least a portion of the combustion heat. The seventh step is to feed a mixed-feed to the annular portion of the second part of the reaction chamber, wherein the second mixed-feed flows counter-currently with the flow of the flue gas in the convection chamber, whereby at least a portion of the mixed-feed absorbs at least a portion of the sensible heat. The eighth step is to mix the first mixed-feed and the second mixed-feed in the reaction chamber. The ninth step is to remove a product stream from the inner portion of the tube-in-tube, wherein the product flows through the inner tubular portion counter-currently with the second mixed-feed.

BRIEF DESCRIPTION OF SEVERAL VIEWS OF THE DRAWINGS

The invention will be described by way of example with reference to the accompanying drawings, in which.

DETAILED DESCRIPTION OF THE INVENTION

The present invention uses a tubular reforming reactor that combines a section of a single tube (radiant tube) and a section of a tube-in-tube (tube within a tube). The single tube section is adjacent a burner(s) and receives direct heat from the burner flame(s). The tube-in-tube section is enclosed with a high emissivity metal wall or a refractory wall coated with high emissivity materials. A reforming reaction in the annuli of the tube-in-tube convectively receives sensible heat from the flue gas on the outside of the outer tube and from the product synthesis gas on the inside of the inner tube. An enclosure for the tube-in-tube section forms a convective channel or convection chamber that allows flue gas to exit the radiant section or combustion chamber. The outside surface of the tube-in-tube section preferably is finned or studded to increase its exposed surface area to the flue gas.

Figure 1:
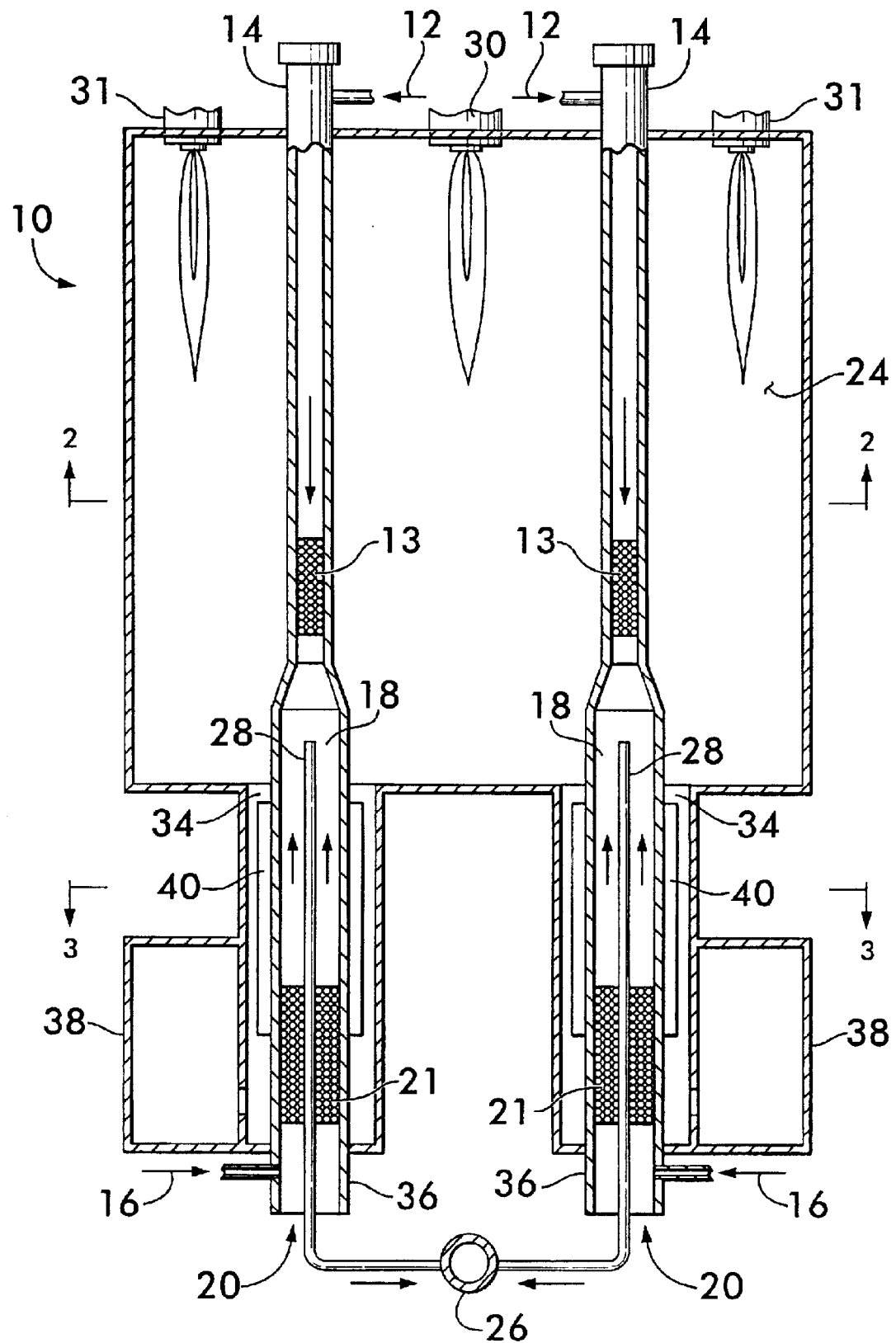
FIG. 1 is a schematic partial cross-sectional elevation view of the reformer apparatus for one embodiment of the invention.

The reformer apparatus 10 of the present invention is shown in FIG. 1. A primary mixed-feed 12 is introduced into the top of the radiant tube 14 and flows co-current with the flue gas generated by the burners (30, 31). The primary mixed-feed reacts in the presence of a catalyst 13 to form syngas products. A secondary mixed-feed 16 is introduced into the annuli 18 of the tube-in-tube 20 at the bottom and flows counter-current with the flue gas. The secondary mixed-feed reacts in the presence of a catalyst 21 to form syngas products. (Although shown and referred to as two separate feed streams, the primary and secondary mixed-feeds may have the same composition, and in fact may be just separate feed streams from a common source of a single mixed-feed.)

The syngas products from the radiant tube 14 in the combustion chamber 24 and the syngas products from the annuli 18 of the tube-in-tube 20 in the convection chamber 34 are mixed in a "mixing zone" (not shown) to form a mixed product gas, which exits the reformer apparatus 10 through the inner tube 28 of the tube-in-tube and is transmitted to a product pipeline 26. The location of the mixing zone is not critical but preferably is at or below the catalyst 13 located in the radiant tube 14.

The counter-current flow of the mixed product gas and the secondary mixed-feed 16 in the annuli 18 allows the mixed product gas to leave the reformer apparatus 10 at a lower temperature than that of product gas leaving a conventional reformer. Thus, the high temperature sensible heat of the mixed product gas is recovered for reforming instead of for generating steam. Mixing of the two streams of syngas products before entering the inner tube 28 of the tube-in-tube 20 opens the temperature pinch, thereby increasing the temperature driving force for heat transfer. Therefore, the present invention resolves the issue encountered by the prior art using only a single tube-in-tube.

The combustion chamber 24 contains at least two burners (30, 31) or sets of burners and conventional radiant tubes 14 that are exposed directly to the burner flames from both sides, similar to conventional reformers. The burners are adapted to combustor a fuel or fuels, thereby generating a flow of flue gas having a temperature of at least 1500 F. Persons skilled in the art will recognize that the burners can be used to introduce heat sources into the combustion chamber from external sources, such as high temperature flue gases, or to dispose of environmentally contaminated gases that may not contain significant heating value. In the embodiment shown in FIG. 1, the burner 30 centered near the top of the combustion chamber generally fires more fuel than the other two burners 31. Preferably, each burner 31 generates from 30% to 100% of the amount of heat generated by burner 30. Persons skilled in the art will recognize that each of the two burners (30 and 31) would generate the same amount of heat if only a single radiant tube is used between the burners (rather than the two tubes and three burners shown in FIG. 1).

The co-current flow of the process and combustion product gases maximizes the heat flux to the radiant tube (reformer tube) 14 without limitation such as observed in the prior art. The flue gas from the combustion chamber 24 enters the convection chamber 34, where the sensible heat of the flue gas is rejected to the outer tube 36 of the tube-in-tube 20, and then leaves the furnace via a flue gas duct 38 at or near the bottom of the furnace. In the convection chamber, the flue gas has a relatively high velocity to maximize heat transfer before leaving the convection chamber. The counter-current flow of the process gas in the annuli 18 and the flue gas in the convection chamber allow the flue gas to exit the reformer at a much lower temperature compared to the exit temperatures of conventional processes. Thus, no shock coil is required, and much smaller convective passes are needed to recover the remaining sensible heat of the flue gas. In addition, many relatively small, substantially symmetrical convection chambers having flue gas flowing at a relatively high velocity serve as a means to improve uniform flow of combustion gas in the combustion chamber.

Figure 2:
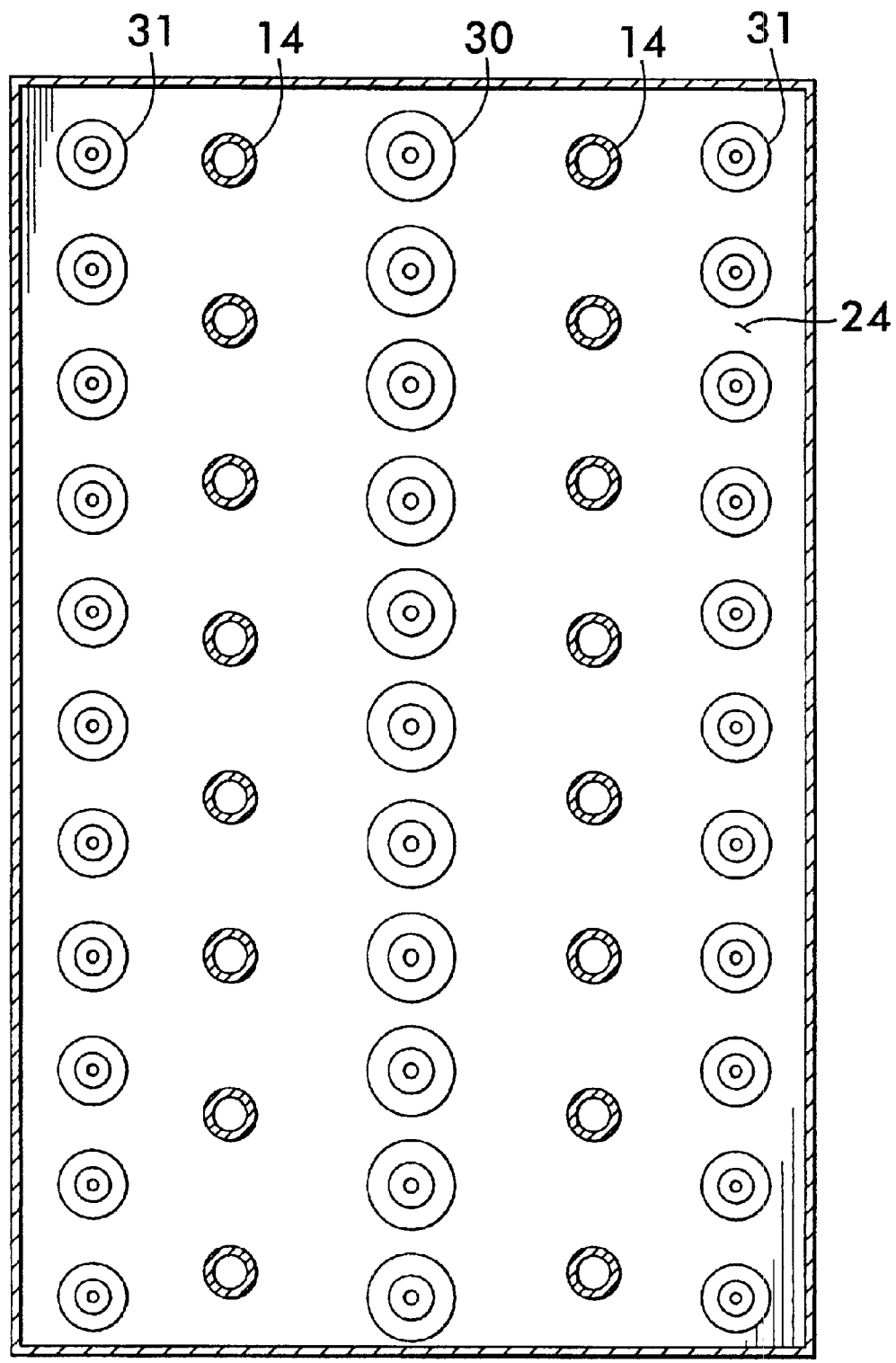
FIG. 2 is a schematic cross-sectional plan view taken along line 2—2 of the embodiment of the invention shown in FIG. 1.
Figure 3:
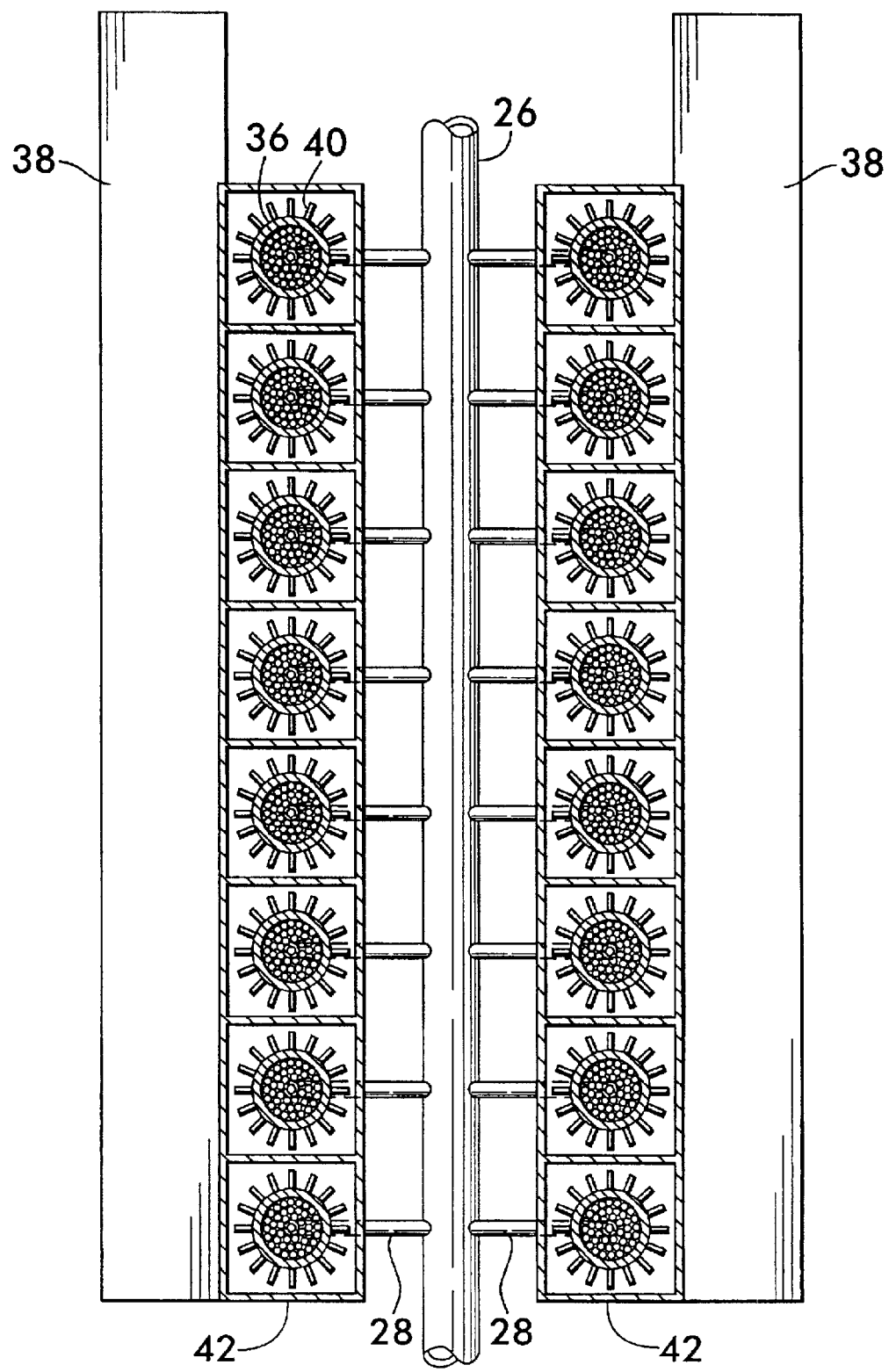
FIG. 3 is a schematic cross-sectional plan view taken along line 3—3 of the embodiment of the invention shown in FIG. 1.

FIG. 2 shows a cross-sectional plan view of the upper portion of the combustion chamber 24, including the radiant tubes 14 and the burners (30, 31). FIG. 3 is a cross-sectional plan view showing the lower portion of the convection chamber 34, including the tube-in-tube 20 portions of the reforming reactors with fins 40 extending out from the outer tube 36 of the tube-in-tube in a preferred embodiment, as also shown in FIG. 1. Referring to FIG. 3, a partition wall 42 encloses each finned tube-in-tube section of each reforming reactor in a preferred embodiment. FIG. 3 also shows the product pipeline 26 that receives the product syngas from the inner tubes 28, and the flue gas exit ducts 38 that carry the flue gas away from the bottom of the furnace.

Persons skilled in the art will recognize that the burners (30, 31) may be located other than as shown in FIGS. 1 and 2, such as at any point on the side walls of the combustion chamber 24. Also, additional burners may be located at or near the bottom of the combustion chamber, or at other locations within the combustion chamber (e.g., at any point on the side walls). Such burners could use waste fuel, excess fuel from the plant, or conventional fuel (e.g., natural gas), as needed. Such additional fuel firing capacity would significantly enhance the heat transfer in the convection chamber 34, which would result in a more efficient furnace or provide a way of increasing the production rate from the tube-in-tube 20 section of the reactor in the convection chamber. Similar results could be achieved by providing to the bottom of the combustion chamber a gas at high temperature (e.g., greater than 1500° F.), such as a flue gas from an external source.

If fuel is fired at or near the bottom of the combustion chamber 24, the partition wall of the convection chamber 34 may need to protrude upward into the combustion chamber to protect the lower section (tube-in-tube 20) of the reforming reactor from direct exposure to the combustion flame(s).

The sensible heat recovery method of the present invention allows users to (1) significantly reduce the heat exchanger equipment to recover both the synthesis gas and the combustion product sensible heats, (2) utilize high grade waste heat from the flue gas for reforming instead of for generating excess steam, (3) better use expensive reformer tubes to recover sensible heat for reforming reactions, (4) effectively integrate the hot product gases (from the radiant tube in the combustion chamber and the tube-in-tube in the convection chamber) to enhance convective heat transfer by increasing the temperature driving force, (5) minimize equipment needs and heat lost due to transfer lines, and (6) combine the combustion and convection chambers in one compact unit that can be built in the shop and serve as a modular unit, so that several units can be added with relatively simple connections in the field to achieve or to expand the synthesis gas production capacity. These and many other benefits and advantages of the present invention, including a significant increase in throughput, will be recognized and appreciated by persons skilled in the art.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An apparatus for a hydrocarbon reforming process, comprising:
   a combustion chamber having a first end and a second end opposite the first end;
   a convection chamber in fluid communication with the combustion chamber, the convection chamber having a first end and a second end opposite the first end, the first end of the convection chamber being adjacent the second end of the combustion chamber;
   at least one burner disposed in the combustion chamber, the burner adapted to combust a fuel, thereby generating a flow of a flue gas from the combustion chamber to the convection chamber, the flue gas having a sensible heat;
   a reaction chamber having a first part and a second part in fluid communication with the first part, a substantial portion of the first part being disposed in the combustion chamber and a substantial portion of the second part being disposed in the convection chamber, wherein the second part is a tube-in-tube having an annular portion between an inner tubular portion and an outer tubular portion surrounding the inner tubular portion;
   means for flowing a first mixed-feed through the first part of the reaction chamber; and
   means for flowing a second mixed-feed through the annular portion of the second part of the reaction chamber counter-currently with the flow of the flue gas in the convection chamber.

2. An apparatus as in claim 1, further comprising a mixing means in the reaction chamber adapted for mixing the first mixed-feed and the second mixed-feed.

3. An apparatus as in claim 1, further comprising a means for removing a product stream from the inner tubular portion of the tube-in-tube, the product stream flowing through the inner tubular portion counter-currently with the second mixed-feed.

4. An apparatus as in claim 1, wherein the first mixed-feed flows co-currently with the flow of the flue gas in the combustion chamber.

5. An apparatus as in claim 4, further comprising at least another burner, the another burner located adjacent the second end of the combustion chamber, the another burner adapted to combust a portion of the fuel or another fuel, thereby generating a flow of another flue gas having another sensible heat, the another flue gas initially flowing in the combustion chamber counter-currently with the first mixed-feed.

6. An apparatus as in claim 4, further comprising at least another burner disposed in the combustion chamber, the another burner adapted to combust a portion of the fuel or another fuel, thereby generating a flow of another flue gas having another sensible heat, the another flue gas initially flowing in the combustion chamber in an initial direction other than co-currently or counter-currently with the first mixed-feed.

7. An apparatus as in claim 4, wherein a gas having another sensible heat is injected adjacent the second end of the combustion chamber, the gas initially flowing in the combustion chamber counter-currently with the first mixed-feed.

8. An apparatus as in claim 1, wherein the substantial portion of the first part of the reaction chamber is substantially vertical in the combustion chamber and the substantial portion of the second part of the reaction chamber is substantially vertical in the convection chamber.

9. An apparatus for a hydrocarbon reforming process, comprising:
   a combustion chamber having a first end and a second end opposite the first end;
   a convection chamber in fluid communication with the combustion chamber, the convection chamber having a first end and a second end opposite the first end, the first end of the convection chamber being adjacent the second end of the combustion chamber;
   at least two reaction chambers spaced apart in substantially parallel relationship, each reaction chamber having a first part and a second part in fluid communication with the first part, a substantial portion of the first part being disposed in the combustion chamber and a substantial portion of the second part being disposed in the convection chamber, wherein the second part is a tube-in-tube having an annular portion between an inner tubular portion and an outer tubular portion surrounding the inner tubular portion;
   a plurality of burners disposed in the combustion chamber, each burner adapted to combust a fuel, thereby generating a flow of a flue gas from the combustion chamber to the convection chamber, the flue gas having a sensible heat, wherein at least one first burner is positioned between the two reaction chambers, a first reaction chamber is positioned between the first burner and a second burner, and a second reaction chamber is positioned between the first burner and a third burner;
   means for flowing a first mixed-feed through the first part of each reaction chamber co-currently with the flow of the flue gas in the combustion chamber;
   means for flowing a second mixed-feed through the annular portion of the second part of each reaction chamber counter-currently with the flow of the flue gas in the convection chamber;
   a mixing means in each reaction chamber adapted for mixing the first mixed-feed and the second mixed-feed; and means for removing a product stream from the inner portion of the tube-in-tube, the product stream flowing through the inner tubular portion counter-currently with the second mixed-feed.

10. An apparatus for a hydrocarbon reforming process, comprising:
    a combustion chamber having a first end and a second end opposite the first end;
    a convection chamber in fluid communication with the combustion chamber, the convection chamber having a first end and a second end opposite the first end, the first end of the convection chamber being adjacent the second end of the combustion chamber;
    at least one reaction chamber having a first part and a second part in fluid communication with the first part, a substantial portion of the first part being disposed in the combustion chamber and a substantial portion of the second part being disposed in the convection chamber, wherein the second part is a tube-in-tube having an annular portion between an inner tubular portion and an outer tubular portion surrounding the inner tubular portion;
    a plurality of burners disposed in the combustion chamber, each burner adapted to combust a fuel, thereby generating a flow of a flue gas from the combustion chamber to the convection chamber, the flue gas having a sensible heat, wherein the reaction chamber is positioned between a first burner and a second burner;
    means for flowing a first mixed-feed through the first part of the reaction chamber co-currently with the flow of the flue gas in the combustion chamber;
    means for flowing a second mixed-feed through the annular portion of the second part of the reaction chamber counter-currently with the flow of the flue gas in the convection chamber;
    a mixing means in the reaction chamber adapted for mixing the first mixed-feed and the second mixed-feed; and
    means for removing a product stream from the inner portion of the tube-in-tube, the product stream flowing through the inner tubular portion counter-currently with the second mixed-feed.

11. A method for producing a product from a steam reforming process, comprising to the steps of:
    providing a combustion chamber having a first end and a second end opposite the first end;
    providing a convection chamber in fluid communication with the combustion chamber, the convection chamber having a first end and a second end opposite the first end, the first end of the convection chamber being adjacent the second end of the combustion chamber;
    providing a reaction chamber having a first part and a second part in fluid communication with the first part, a substantial portion of the first part being disposed in the combustion chamber and a substantial portion of the second part being disposed in the convection chamber, wherein the second part is a tube-in-tube having an annular portion between an inner tubular portion and an outer tubular portion surrounding the inner tubular portion;
    combusting a fuel in the combustion chamber, thereby generating a combustion heat and a flow of a flue gas from the combustion chamber to the convection chamber, the flue gas having a sensible heat;
    feeding a first mixed-feed to the first part of the reaction chamber, wherein at least a portion of the first mixed-feed absorbs at least a portion of the combustion heat; and
    feeding a second mixed-feed to the annular portion of the second part of the reaction chamber, wherein the second mixed-feed flows counter-currently with the flow of the flue gas in the convection chamber, whereby at least a portion of the second mixed-feed absorbs at least a portion of the sensible heat.

12. A method as in claim 11, comprising the further step of mixing the first mixed-feed and the second mixed-feed in the reaction chamber.

13. A method as in claim 11, comprising the further step of removing a product stream from the inner tubular portion of the tube-in-tube, the product stream flowing through the inner tubular portion counter-currently with the second mixed-feed.

14. A method as in claim 11, wherein the first mixed-feed flows co-currently with the flow of the flue gas in the combustion chamber.

15. A method as in claim 14, comprising the further step of:
    combusting a portion of the fuel or another fuel near the second end of the combustion chamber, thereby generating another combustion heat and a flow of another flue gas having another sensible heat, wherein the another flue gas initially flows in the combustion chamber counter-currently with the first mixed-feed.

16. A method as in claim 14, comprising the further step of:
    combusting a portion of the fuel or another fuel in the combustion chamber, thereby generating another combustion heat and a flow of another flue gas having another sensible heat, wherein the another flue gas initially flows in the combustion chamber in an initial direction other than co-currently or counter-currently with the first mixed-feed.

17. A method as in claim 14, comprising the further step of:
    injecting a gas having another sensible heat near the second end of the combustion chamber, the gas initially flowing in the combustion chamber counter-currently with the first mixed-feed.

18. A method as in claim 11, wherein the substantial portion of the first part of the reaction chamber is substantially vertical in the combustion chamber and the substantial portion of the second part of the reaction chamber is substantially vertical in the convection chamber.

19. A method for producing a product from a steam reforming process, comprising the steps of:
    providing a combustion chamber having a first end and a second end opposite the first end;
    providing a convection chamber in fluid communication with the combustion chamber, the convection chamber having a first end and a second end opposite the first end, the first end of the convection chamber being adjacent the second end of the combustion chamber;
    providing at least two reaction chambers spaced apart in substantially parallel relationship, each reaction chamber having a first part and a second part in fluid communication with the first part, a substantial portion of the first part being disposed in the combustion chamber and a substantial portion of the second part being disposed in the convection chamber, wherein the second part is a tube-in-tube having an annular portion between an inner tubular portion and an outer tubular portion surrounding the inner tubular portion;

providing a plurality of burners disposed in the combustion chamber, each burner adapted to combust a fuel, wherein at least one first burner is positioned between the two reaction chambers, a first reaction chamber is positioned between the first burner and a second burner, and a second reaction chamber is positioned between the first burner and a third burner;

combusting a fuel in the burners, thereby generating a combustion heat and a flow of a flue gas from the combustion chamber to the convection chamber, the flue gas having a sensible heat;

feeding a first mixed-feed to the first part of each reaction chamber, wherein the first mixed-feed flows co-currently with the flow of the flue gas in the combustion chamber, and at least a portion of the first mixed-feed absorbs at least a portion of the combustion heat;

feeding a second mixed-feed to the annular portion of the second part of each reaction chamber, wherein the second mixed-feed flows counter-currently with the flow of the flue gas in the convection chamber, whereby at least a portion of the second mixed-feed absorbs at least a portion of the sensible heat;

mixing the first mixed-feed and the second mixed-feed in each reaction chamber; and removing a product stream from the inner portion of the tube-in-tube, wherein the product stream flows through the inner tubular portion counter-currently with the second mixed-feed.

20. A method for producing a product from a steam reforming process, comprising the steps of:

providing a combustion chamber having a first end and a second end opposite the first end;

providing a convection chamber in fluid communication with the combustion chamber, the convection chamber having a first end and a second end opposite the first end, the first end of the convection chamber being adjacent the second end of the combustion chamber;

providing at least one reaction chamber having a first part and a second part in fluid communication with the first part, a substantial portion of the first part being disposed in the combustion chamber and a substantial portion of the second part being disposed in the convection chamber, wherein the second part is a tube-in-tube having an annular portion between an inner tubular portion and an outer tubular portion surrounding the inner tubular portion;

providing a plurality of burners disposed in the combustion chamber, each burner adapted to combust a fuel, wherein the reaction chamber is positioned between a first burner and a second burner;

combusting a fuel in the burners, thereby generating a combustion heat and a flow of a flue gas from the combustion chamber to the convection chamber, the flue gas having a sensible heat;

feeding a first mixed-feed to the first part of the reaction chamber, wherein the first mixed-feed flows co-currently with the flow of the flue gas in the combustion chamber, and at least a portion of the first mixed-feed absorbs at least a portion of the combustion heat;

feeding a second mixed-feed to the annular portion of the second part of the reaction chamber, wherein the second mixed-feed flows counter-currently with the flow of the flue gas in the convection chamber, whereby at least a portion of the second mixed-feed absorbs at least a portion of the sensible heat;

mixing the first mixed-feed and the second mixed-feed in the reaction chamber; and removing a product stream from the inner portion of the tube-in-tube, wherein the product stream flows through the inner tubular portion counter-currently with the second mixed-feed.

* * * * *